(12) United States Patent
McClendon

(10) Patent No.: US 7,409,202 B2
(45) Date of Patent: Aug. 5, 2008

(54) COMMUNICATIONS RESTRICTIONS FOR MOBILE GROUP COMMUNICATION DEVICES

(75) Inventor: Ginger D. McClendon, Herndon, VA (US)

(73) Assignee: Nextel Communications Inc., Reston, VA (US)

( * ) Notice: Subject to any disclaimer, the term of this patent is extended or adjusted under 35 U.S.C. 154(b) by 453 days.

(21) Appl. No.: 10/915,689

(22) Filed: Aug. 11, 2004

(65) Prior Publication Data
US 2005/0078619 A1    Apr. 14, 2005

Related U.S. Application Data

(60) Provisional application No. 60/494,091, filed on Aug. 12, 2003.

(51) Int. Cl.
*H04J 3/24* (2006.01)

(52) U.S. Cl. .................... 455/404.1; 455/414; 455/436; 379/106.09; 370/312

(58) Field of Classification Search ................ 370/312; 455/519, 518, 404.1, 414, 436; 340/7.46; 379/106.04
See application file for complete search history.

(56) References Cited

U.S. PATENT DOCUMENTS

| 5,638,369 A | 6/1997 | Ayerst |
| 5,929,777 A | 7/1999 | Reynolds |
| 6,493,549 B1 * | 12/2002 | Axelson et al. ............. 455/419 |
| 6,647,260 B2 | 11/2003 | Dusse |
| 6,661,881 B1 * | 12/2003 | Garland et al. ......... 379/106.09 |
| 7,330,693 B1 * | 2/2008 | Goss .......................... 455/3.01 |
| 2005/0078619 A1 * | 4/2005 | McClendon ................ 370/312 |
| 2006/0154642 A1 * | 7/2006 | Scannell, Jr. ............. 455/404.1 |
| 2007/0238460 A1 * | 10/2007 | Yamen ........................ 455/436 |

\* cited by examiner

*Primary Examiner*—William D Cumming

(57) ABSTRACT

Systems and methods for managing a mobile communication device group. A communication device sends a message from a member of a sender group and a network transmits the message to the recipient group if the identity of the sender group exists in a communication permission parameter associated with the recipient group. Systems and methods for transmitting a message to a group of communication device users in an identified geographical area. A graphical display presents a geographical representation of an area. A selection tool for identifying one or more communication device users located within a defined area. The network transmits a message from a sender to the users located within the defined area.

24 Claims, 7 Drawing Sheets

Fig. 1

Group Name: Washington Metro Public Safety
Allow Sub-Group Intercommunication: No
White List: <empty>
Black List: <empty>
Group Name: Fairfax County Public Safety
Allow Sub-Group Intercommunication: Yes
White List:
    Washington Metro Public Safety
Black List:
    Washington D.C. Park Police

COMMUNICATIONS RESTRICTIONS FOR MOBILE GROUP COMMUNICATION DEVICES

CLAIM OF PRIORITY

This application claims priority to U.S. Provisional Application No. 60/494,091 entitled "Push-to-Talk Public Service Restrictions" filed Aug. 12, 2003, which is hereby incorporated by reference in its entirety.

FIELD OF INVENTION

This invention relates to managing communication groups and their component mobile communication devices. More specifically, this invention relates to the establishment of communication groups and their hierarchical administration.

BACKGROUND

It is often very useful to communicate among various public safety organizations as groups. For example, it may be that a dispatcher wishes to communicate with all members of a specified police department in a certain metropolitan area. However, members of other police departments in the metropolitan area might wish to ignore communications not directed to them.

When communicating a message between a sender and a recipient, it is useful to set certain parameters. These parameters can include send and receive and permissions and can be administered from a central location. Without management or administration of communication between groups that permits the filtering of certain communications, important communications could be lost among other communications taking place. This is particularly relevant in the context of public safety organizations where many participants may be attempting to communicate with each other simultaneously.

One object of the invention is to solve the above problem and to provide a method by which a user can communicate with the intended groups of other users and avoid communication with those with whom communication is not intended. While this invention could be used by public service agencies, it could also be used in any situation where an individual user or group of users wishes not to receive communications from certain other groups.

SUMMARY OF THE INVENTION

Broadly described herein are systems and methods for managing communication groups.

In one embodiment, the invention is a system for managing a mobile communication device group. The system can include a communication device for sending a message from a member of a sender group, the message including an identification of a recipient group and an identification of the sender group. The system can also include a network for receiving the message and a system data store in electronic communication with the network for storing a communication permission parameter associated with the sender group and a communication permission parameter associated with the recipient group. The system can also include a system processor in electronic communication with the system data store to compare the identification of the sender group to a communication permission parameter associated with the recipient group. In such an embodiment, the system processor can be further configured to transmit the message to the recipient group if the identity of the sender group exists in a communication permission parameter associated with the recipient group.

In another embodiment, the invention is a method for managing mobile group communication including sending a message from a member of a sender group, embedding in the message an identification of a recipient group and an identification of the sender group, and transmitting the message to a network. The invention can also include comparing the identification of a sender group with a communication permission parameter associated with the recipient group and transmitting the message to the recipient group if the identity of the sender group exists in the communication permission parameter associated with the recipient group.

In yet another embodiment, the invention is a system for transmitting a message to a group of communication device users in an identified geographical area including a graphical display for presenting a geographical representation of an area and a selection tool for identifying a location boundary defining an area on the graphical display. The system can also include a system processor for comparing location data received from a communication device with the defined area and identifying a communication device user located within the defined area. In such an embodiment, a network can be used to transmit a message from a sender to a user located within the defined area.

In a still further embodiment, the invention is a method for transmitting a message to a group of communication device users in an identified geographical area including presenting a geographical representation of an area on a graphical display, identifying a location boundary defining an area on the graphical display with a selection tool, and comparing location data received from a communication device with the defined area. The invention can also include identifying at least one communication device user located within the defined area and transmitting a message from a sender to the at least one user located within the defined area over a network.

BRIEF DESCRIPTION OF THE DRAWINGS

The invention will be better understood by reference to the Detailed Description of the Invention when taken together with the attached drawings, wherein:

FIG. 1 shows a table identifying exemplary groups and associated communication parameters;

DETAILED DESCRIPTION OF THE INVENTION

One feature of the system of the invention is to provide interoperability between various networked users and groups of users using mobile communication devices while filtering unwanted messages. As will be further described below, communication permission parameters can be arranged by one or more administrators in communication with a network. While this description refers to messages, one skilled in the art will recognize that messages can be any electronic content carried over any network from a sender to a recipient. In the context of the present invention, "messaging" is to be interpreted as including, where the context permits, the transfer between network nodes of any data transfer unit, and including the transfer of any application data message, error message, reconfiguration message, or network status message.

In one exemplary embodiment, messaging can take place over a packet switched network, such as iDEN (Integrated Digital Enhanced Network), or any other network for two-way radio, telephone, text messaging and data transmission, particularly including wireless networks but also having applicability to wired and mixed networks that include both wired and wireless devices in communication therewith. The permission parameters defined by the administrator and discussed in more detail below can be managed separately and independently from the underlying network. That is, the parameters set by the administrator are not dependent on the specific implementation of the mobile communication network.

As used in this specification, a message can refer to any communicative information and can include text messages, packets containing data that can be reassembled as voice, or any other electronic representation of information. A message according to the invention can include an identification of a sender, an identification of a recipient and body content. As non-limiting examples, the body content of a message can include character text, voice or video in electronic form. The identity of the sender can further include an identification of the sender's communication device, the sender's name, or any groups to which the sender may belong.

The identification of a recipient can identify an individual communication device user or it can identify a group of communication device users. If a sender selects a group as the recipient of a message, the message can be transmitted to each member of the identified group. In some embodiments of particular relevance for public safety agencies, communication devices can be equipped with an emergency group connect button which transmits a message to a predetermined public safety group designated by a group administrator.

Figure 4:
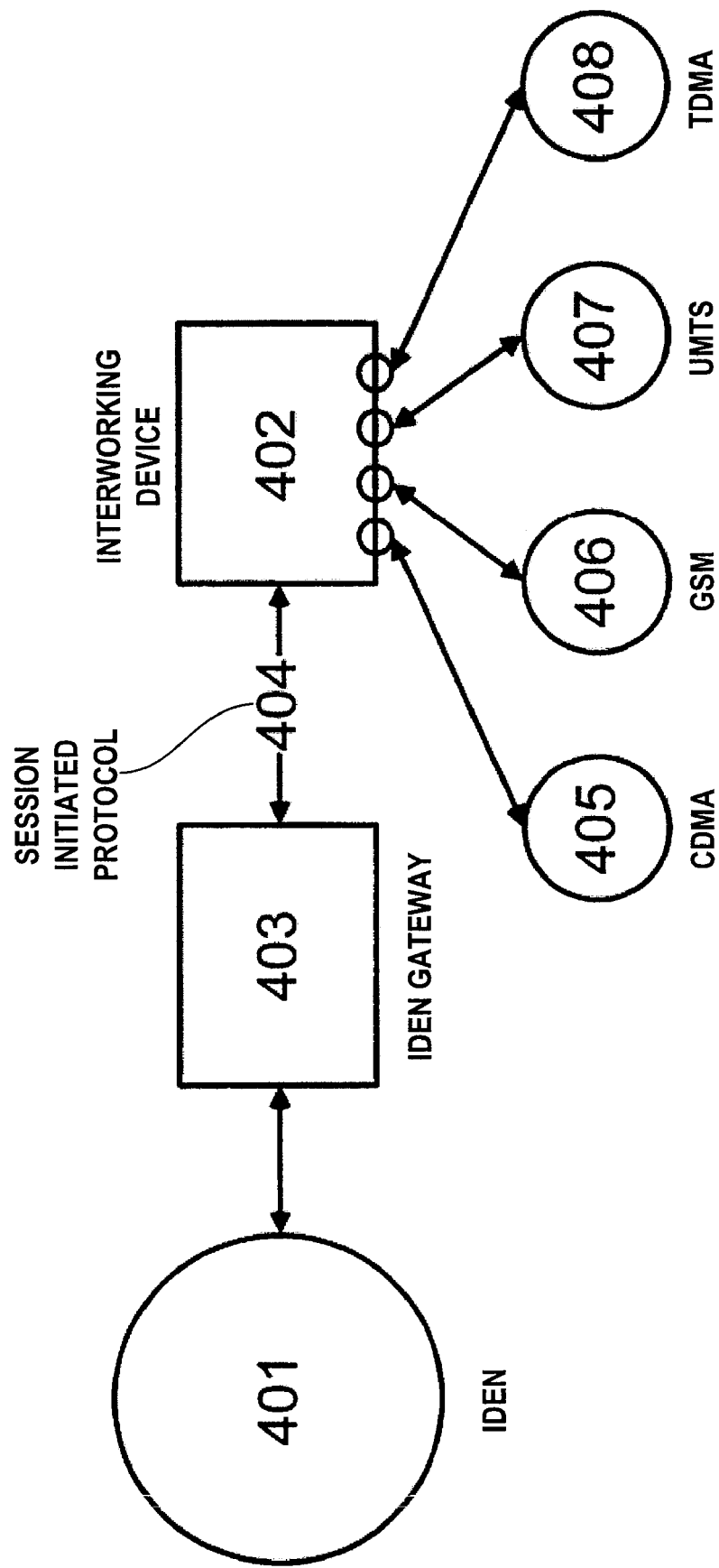
FIG. 4 shows an exemplary system for sending messages between a plurality of networks.

The systems and methods for managing communication systems summarized above and described in more detail below can be implemented over a plurality of networked communication devices, such as, but not limited to wireless networks. In one exemplary embodiment shown in FIG. 4, an iDEN (401) can be in electronic communication with a broad range of radio access networks. Once the radio access networks are in electronic communication with the iDEN (401), messages can be transmitted between users and groups using iDEN (401) and users and groups using alternative radio access networks. As shown in FIG. 4, iDEN (401) communicates with Interworking Device (402) through an iDEN gateway (IGW) (403) functioning as a protocol converter between iDEN (401) and the Interworking Device (402) which receives communication conforming to the Session Initiated Protocol (SIP) (404). Interworking Device (402) can communicate with devices through one or more dispatch networks. As non-limiting examples, the Interworking Device (402) can send and receive messages to and from communication devices operating in CDMA (Code Division Multiple Access) (405), GSM (Global System for Mobile Communication) (406), UMTS (Universal Mobile Telecommunications System) (407), or TDMA (Time Divisional Multiple Access) (408) networks. The Interworking Device (402) of the present invention can be configured to communicate with any type of radio access network.

Because the systems of the invention can transmit messages across varied types of radio access networks, groups can be defined without limitation by the type of radio access network used to connect or communicate with any given user or group member.

System Architecture

Figure 3:
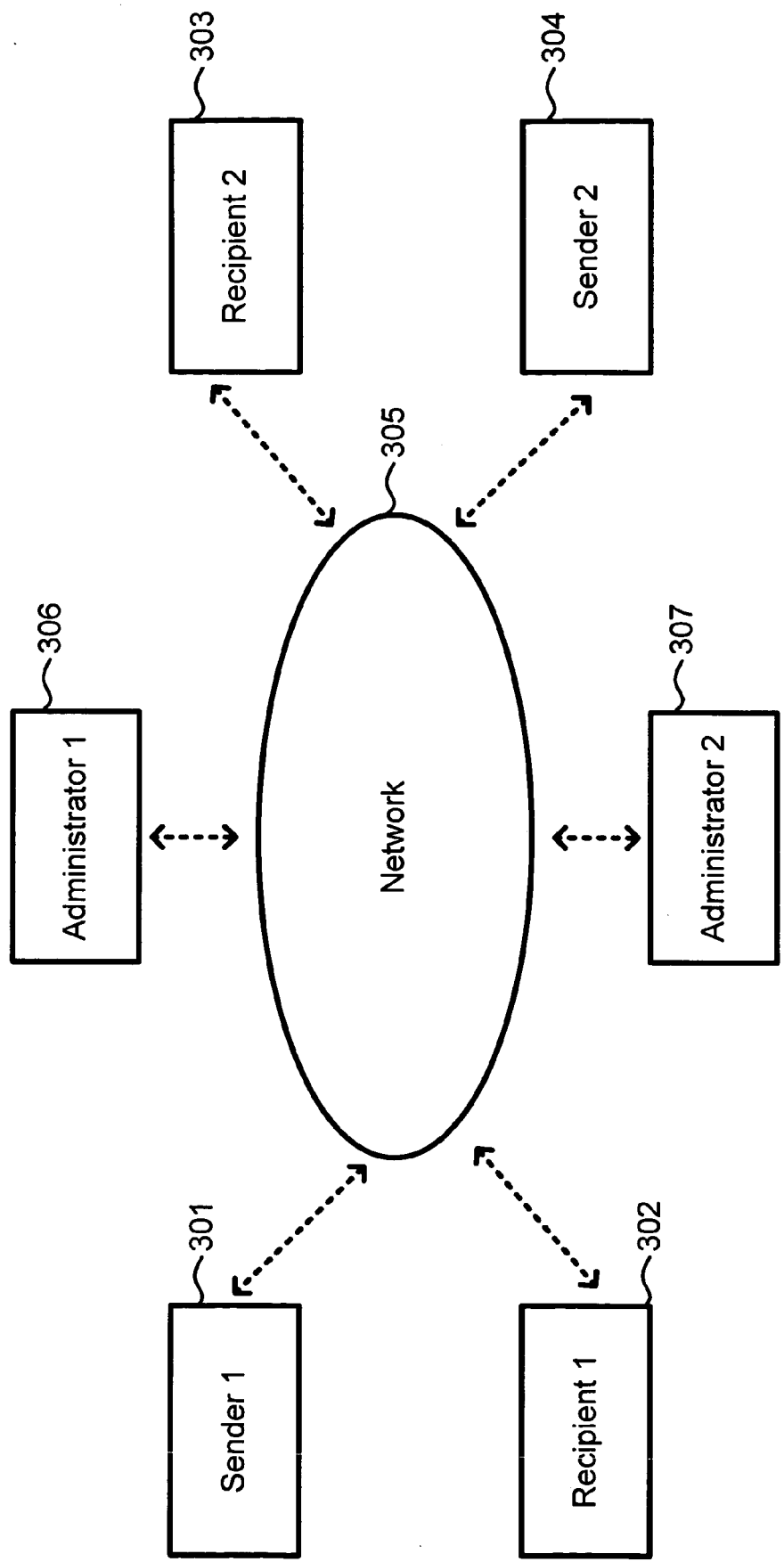
FIG. 3 shows an exemplary network topology.

A typical embodiment of the system includes at least two communication devices and a network. As shown in FIG. 3, communication device 301 is in communication with network 305 which is in communication with one or more additional communication devices (302, 303, 304) and at least one network administrator (306 and 307). Communication between communication devices (301-304) and the network administrators (306, 307) can be passed through network 305. The communication devices (301-304) can be coupled to network 305 via any system suitable for transmitting data known to one of ordinary skill in the art. As a non-limiting example, the devices (301-304) and administrators (306, 307) can be coupled to the network 305 by wireless transmission. According to the invention, any suitable system of networked wireless transmission known to one of ordinary skill can be used to facilitate communication among the networked elements.

The network can receive a message from a sender (301, 304) and parse it to extract the identity of one or more recipients (302, 303). One embodiment according to the invention includes one or more system processors that support the desired functionality as described in detail below and a system data store (SDS) that stores data associated with this functionality. The system processor is in communication with the SDS. In one exemplary embodiment, the system processors of the network can perform the functions of sending, receiving and parsing messages.

The SDS may include multiple physical and/or logical data stores for storing the various types of information used. Data storage and retrieval functionality can be provided by either the system processor or one or more data storage processors associated with the SDS. The system processor is in communication with the SDS via any suitable communication channel(s). The system processor may include one or more processing elements that are adapted or programmed to support the desired parsing of messages and/or other networking functionality.

In one embodiment, the network system includes a system processor potentially including multiple processing elements. The term processing element may refer to (1) a process running on a particular piece, or across particular pieces, of processing hardware, (2) a particular piece of processing hardware, or either (1) or (2) as the context allows. Each processing element can be supported via a standard general purpose processor such as, an Intel-compatible processor platform preferably using at least one PENTIUM III, PENTIUM IV or CELERON, PENTIUM, XEON, ITANIUM (Intel Corp., Santa Clara, Calif.) class processor; alternative processors such as MIPS (MIPS Technologies, Mountain View, Calif.) or UltraSPARC (Sun Microsystems, Inc., Palo Alto, Calif.) could be used in other embodiments, as well as other microprocessors which are well known in the art. The system processor can include one or more field programmable gate arrays (FPGAS) and/or application specific integrated circuits (ASICs) configured to perform at least a portion of the functionality according to the present invention. In other embodiments, an embedded microprocessor can be used such as, but not limited to, an ARM (ARM, Carlsbad, Calif.) processor core.

In some embodiments, the system processor can include a combination of general purpose processors, ASICs and/or FPGAs. In some embodiments functionality can be distributed across multiple processing elements. In some such embodiments, aspects of the functionality or portions thereof may be executed in series or in parallel; particular functionality or portions thereof executed a multiplicity of times may also occur in series or parallel.

In a system processor including at least one general purpose processor, the general purpose processor typically runs an appropriate operating system such as, but not limited to, WINDOWS/NT, WINDOWS 2000 or WINDOWS/XP (Microsoft Corp., Redmond, Wash.), RIX (Silicon Graphics, Inc., Mountain View, Calif.), Solaris SOLARIS (Sun Microsystems, Inc., Palo Alto, Calif.), or LINUX (or other UNIX variant).

The SDS could include a variety of primary and secondary storage elements. In one preferred embodiment, the SDS would can include random access memory (RAM) as part of the primary storage. The primary storage can, in some embodiments, include other forms of memory such as cache memory, registers, non-volatile memory (e.g., FLASH, ROM, EPROM, etc.), etc.

The SDS can also include secondary storage including single, multiple and/or varied servers and storage elements. For example, the SDS can use internal storage devices connected to the system processor. In embodiments where a single processing element supports all of the system functionality, a local hard disk drive can serve as the secondary storage of the SDS, and a disk operating system executing on such a single processing element can act as a data server receiving and servicing data requests. A system bus can serve as the communication channel between the system processor and the SDS (typically, at least RAM and the hard disk drive).

The Administrator

The communication system can include an administrator. The administrator can be one or more individuals, groups of individuals or an automated system. As shown in the example of FIG. 3, the network 305 can be in electronic communication with one or more administrators (306, 307). An administrator can define communication parameters for individual mobile communication devices or groups of communication devices. An administrator can define groups manually or automatically. An administrator can add or remove communication devices to groups.

Figure 2:
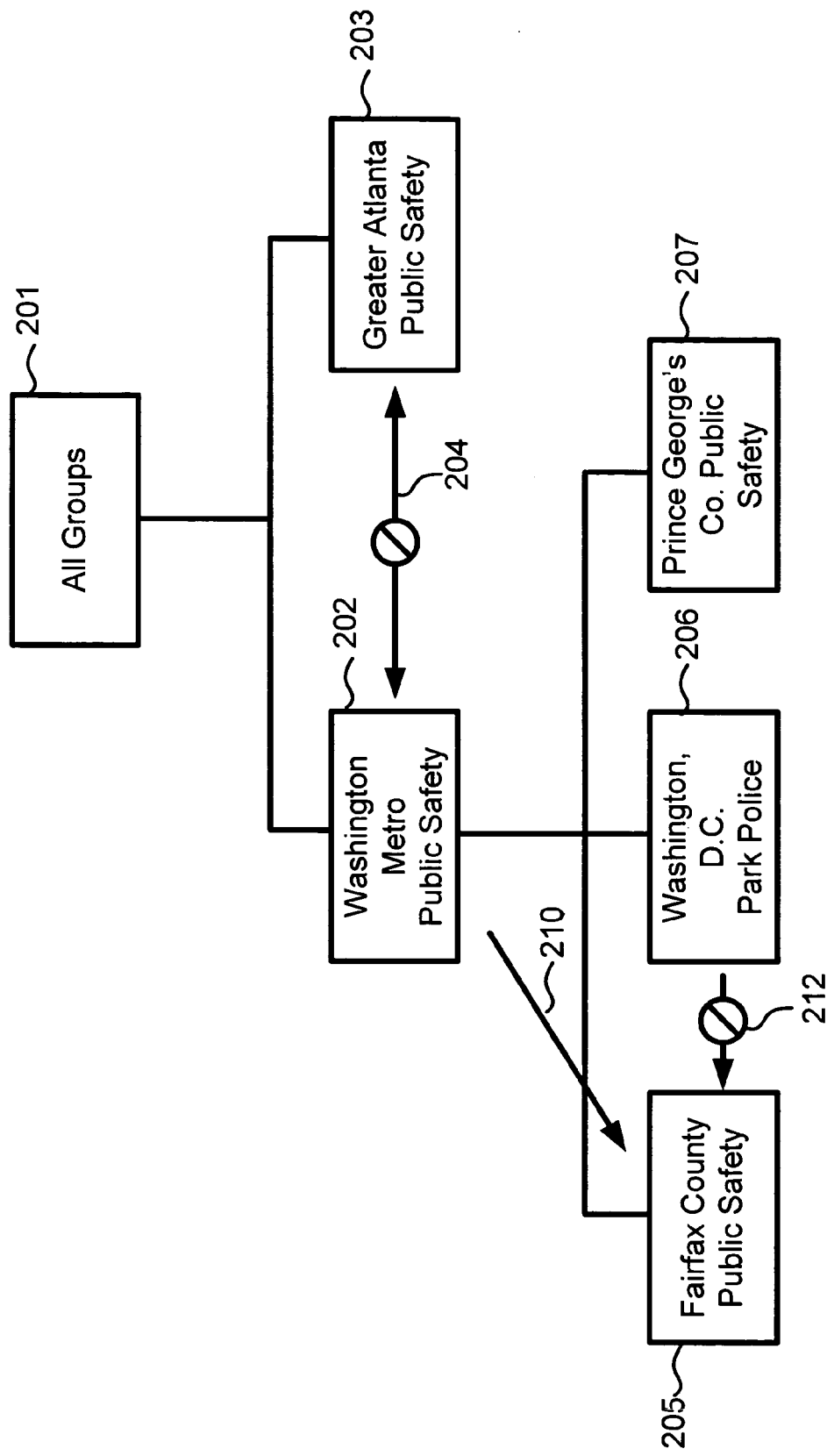
FIG. 2 shows a group management functional example.

An administrator can perform hierarchical management. For example, the administrator can apply a parameter to all communication devices in a group or to all communication devices in several groups. In some embodiments, groups can be organized in a hierarchy. One example of a hierarchy of groups is shown in FIG. 2. FIG. 2 graphically illustrates the communication parameters shown in the table of FIG. 1. Group 201 is a top-level group and every other group is a member of group 201. In the example shown in FIG. 2, group 201 is a parent of group 202 and group 203. Group 202 is a parent of additional groups 205, 206 and 207. When parameters are defined for a parent group which includes sub-groups, at least one of the parameters defined for the parent group can be applied to at least one of the sub-groups. According to the invention, any group or sub-group can be configured to propagate some or all of its parameters to any sub-groups of the group or sub-group.

The administrator can define groups based on a present location of a communication device or on the location of a communication device at the time of group creation. Additionally, predetermined users or communication devices can be assigned to a group without regard to the physical location of the user or communication device. In some embodiments, communication devices can include functionality that permits a device to determine its location and transmit that location to the network where it can be received by an administrator. For example, some communication devices can be GPS (Global Positioning System) enabled. Once the administrator has received the geographical location of certain communication devices, it can assign those devices to groups based on their location. For example, the administrator can create a group including all communication devices within a certain distance from a central location. Alternatively, the administrator can add a user or communication device to a group by identifying the user or communication device and manually adding that user or device to a group.

Figure 5:
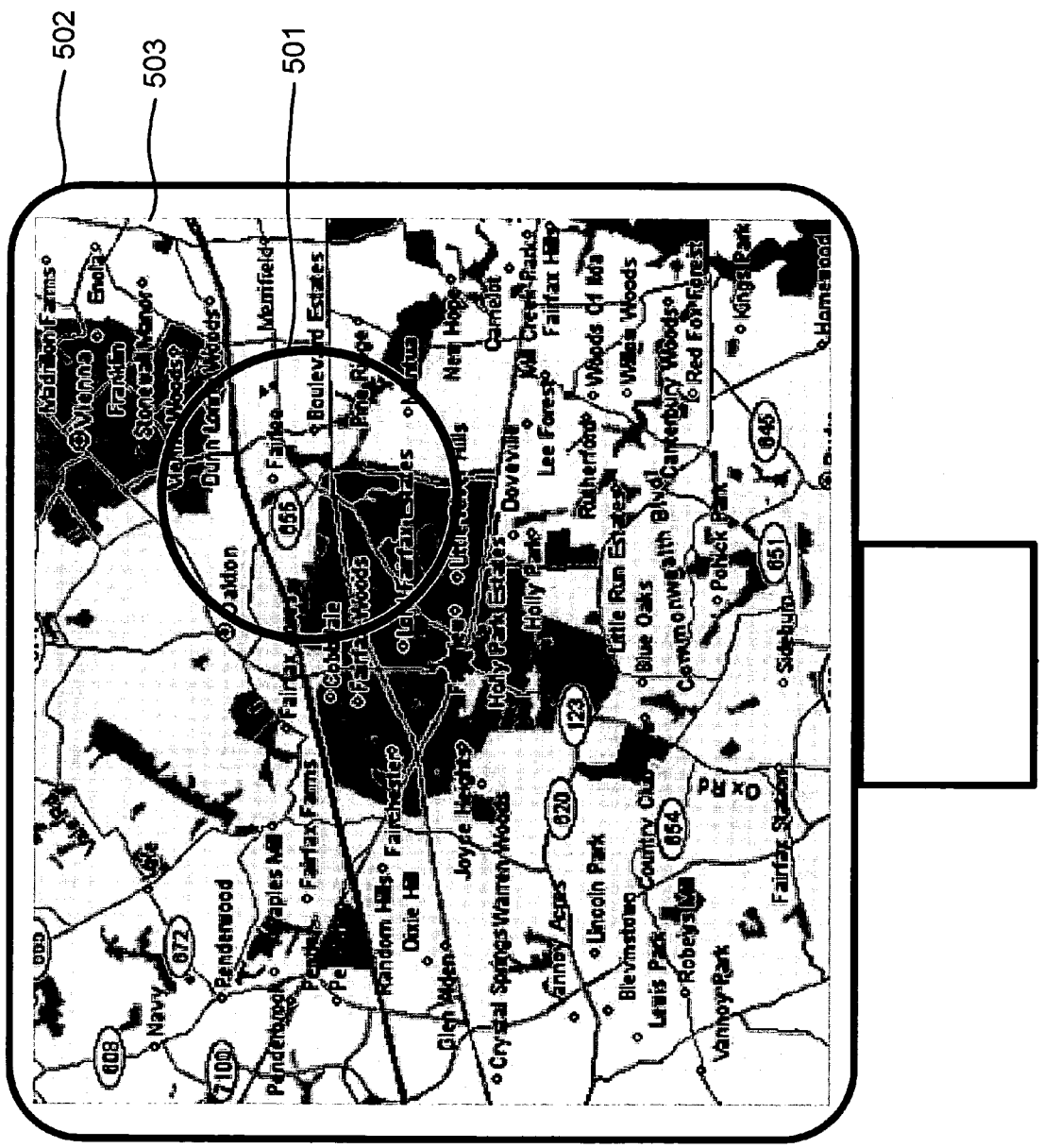
FIG. 5 shows an exemplary graphical display presenting a geographical representation of an area and a selection tool.
Figure 6:
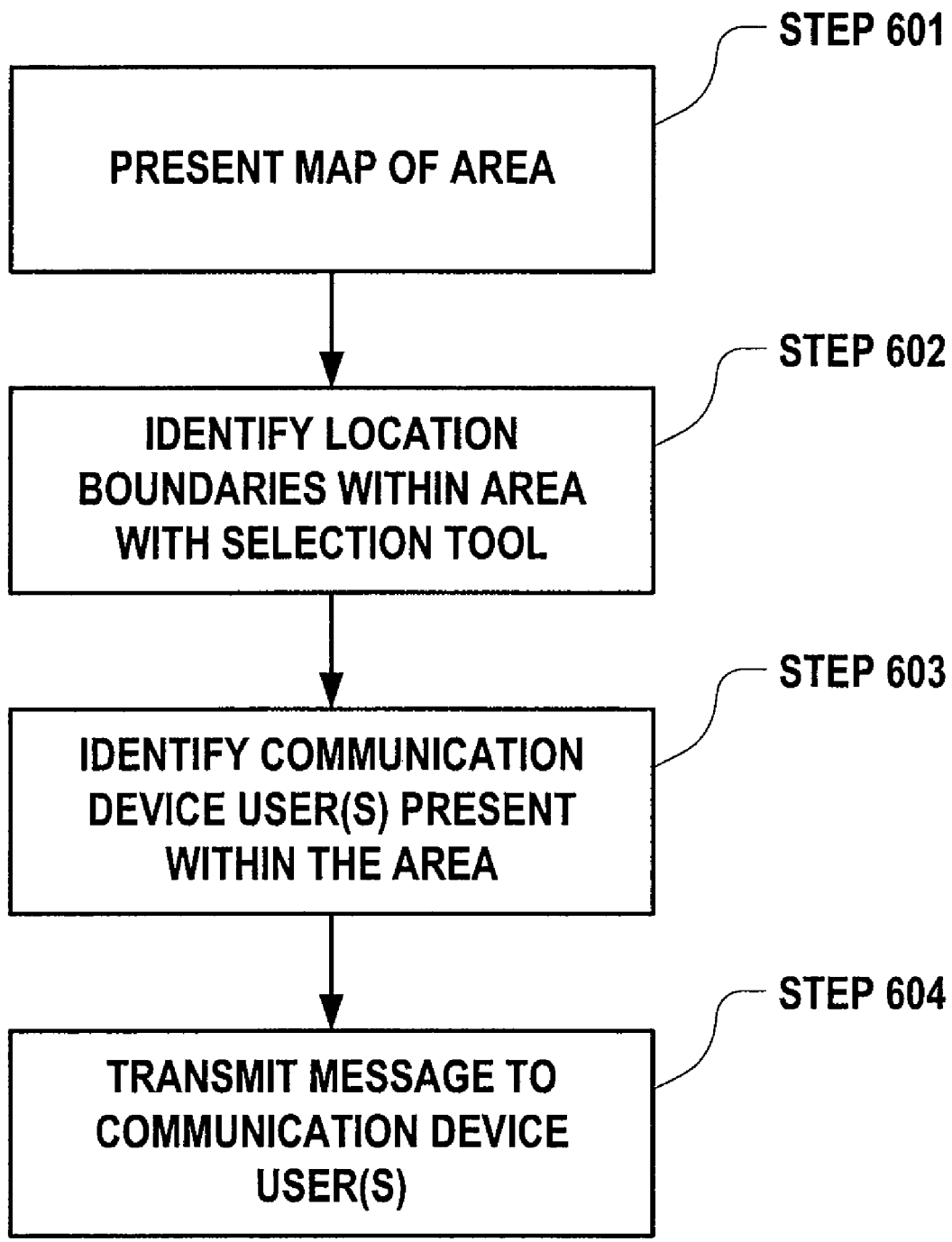
FIG. 6 shows an exemplary method for sending messages using a geographical representation of an area and a selection tool.

Administration can be performed through the use of a graphical user interface. As shown in FIG. 5 and FIG. 6, in some embodiments, a graphical interface (502) can be used to present (step 601) a map (503) of an area and a selection tool (501) for identifying location boundaries within the area. The administrator can use the selection tools to identify (step 602) portions of the geographical area displayed on the map and thereby define (step 603) a group of users physically then present in the area. This identification can be performed by using a system processor to compare location data received from GPS-enabled communication devices with the location boundaries identified by the selection tools.

A geographically defined group can be messaged in the same manner as any other predefined group of communication devices. In one exemplary embodiment, the network can send (step 604) a message prepared by the administrator or another user to some or all of the communication devices identified as being positioned within the identified location boundaries.

Communication Permissions

A communication permission according to the invention function as a filter and can be defined by an administrator. As non-limiting examples, permissions can be applied to users based on general network groupings, geography or disaster/emergency groupings. As described in more detail below, permissions can be implemented by sub-group intercommunication parameters, whitelists or blacklists. In one exemplary embodiment, when a user is placed into a network group, the default configuration provides that other users in that group can freely call the user and the user can freely call other users in the network group. These default configurations can be superseded by blacklisting parameters. When group parameters are defined by the administrator, individual user parameters will only be activated when they do not conflict with predefined group parameters. For example, individual communication devices used in a public safety organization may be capable of receiving messages from a plurality of outside sources, some of which may be not be related to public safety. An administrator can adjust blacklist parameters to configure the network to block all messages sent to certain recipients that are not originated within another public safety organization. Additionally, the administrator could adjust whitelist parameters to allow messages only from other predetermined public safety organizations.

Sub-group Intercommunication

As discussed above, groups of users can be arranged in hierarchical relationships. An exemplary arrangement is shown in FIG. 2. In the example of FIG. 2, groups 202 and 203 are sub-groups on the same hierarchical level and communication between these groups has been disabled as indicated by the sub-group intercommunication blocking symbol 204. If sub-group intercommunication is disabled between two groups, then no messages sent by either group will be received by either group. Communication between sub-groups at the same hierarchical level (groups 202 and 203) can be enabled or disabled by the administrator of the parent of both groups (group 201). It may be advantageous to disable sub-group communication if the sub-groups are physically distant or functionally unrelated. In the example of FIG. 2, Washington Metro Public Safety (group 202) is physically distant from Greater Atlanta Public Safety (group 203) and sub-group intercommunication has been disabled.

Whitelists and Blacklists

The communication system can include blacklists and whitelists associated with groups, individual users and communication devices. A blacklist for a given user defines the identities of other users from whom incoming messages will be denied. A whitelist for a given user defines the identities of other users from whom incoming messages will be accepted. Whitelists and blacklists can be created by an individual user or they can be defined by one or more administrators and applied as parameters to groups of users.

In the example shown in FIG. 2, Fairfax County Public Safety (205) has whitelisted (210) Washington Metro Public Safety (202). As a result, members of Fairfax County Public Safety (205) can receive all messages sent by members of Washington Metro Public Safety (202). Members of Washington Metro Public Safety (202) cannot receive messages from Fairfax County Public Safety (205) unless an administrator adds Fairfax County Public Safety (205) to the Washington Metro Public Safety (202) whitelist. In embodiments of the communication system for use with public safety groups, it may be desirable that the whitelists and blacklists be defined by an administrator. Like other parameters defined for a group, whitelists and blacklists can be inherited by sub-groups in the hierarchy. Inherited blacklists and whitelists can be applied to users of individual communication devices or groups of individuals.

The system can be arranged with default settings that allow or disallow incoming communication between sub-groups such as groups 202 and 203 in FIG. 2. In embodiments where incoming communication from other sub-groups are disallowed, to send and receive messages from an entity outside its network groupings, the sender must be added to a whitelist through an administrative interface. In the example shown in FIG. 2, Fairfax County Public Safety (205) has whitelisted (210) communication from Washington Metro Public Safety (202). As a result, communication sent by members of Washington Metro Public Safety (202) can be received by members of Fairfax County Public Safety (205).

If a user wants to block members of any network group, it can be done by an administrator through an administrative interface. Blacklisting can be done at the individual or group level. Blacklisting can be used to block messages from some or all members of predetermined groups of users, outside entities or general non-public safety users. Changes to blacklists and whitelists can be made effective immediately after issuance by the administrator or the administrator can set blackout time periods during which time messages from predetermined users or groups of users can be blocked. In some embodiments, if a user or group is blacklisted, the network can send a message to the blacklisted parties informing the parties of the blacklisting.

In the example shown in FIG. 2, Fairfax County Public Safety (205) has blacklisted (212) Washington, D.C. Park Police (206). As a result, communication sent by members of Washington, D.C. Park Police (206) cannot be received by members of Fairfax County Public Safety (205).

If sub-group communication is enabled between a first group and a second group, it is not necessary that each group add the other to its whitelist because communication between the groups is supported by virtue of enabling the sub-group intercommunication. If a user is made a member of a network group, other members in that group can send a message to the user. The user can freely message other members of that group unless the user has been individually blacklisted by that group. In some embodiments, if a user has been blacklisted, the network messages the sending party that the recipient has blacklisted the sending party.

In some embodiments, in order for a message from a user to be received by an entity outside of a user's network groupings, both the entity and the user must specify each other in their whitelist parameters. This is referred to as a "two-doors to entry policy." In such embodiments, a sender and a recipient must both belong to groups that have whitelisted each other for a communication to be passed between members of the groups.

Figure 7:
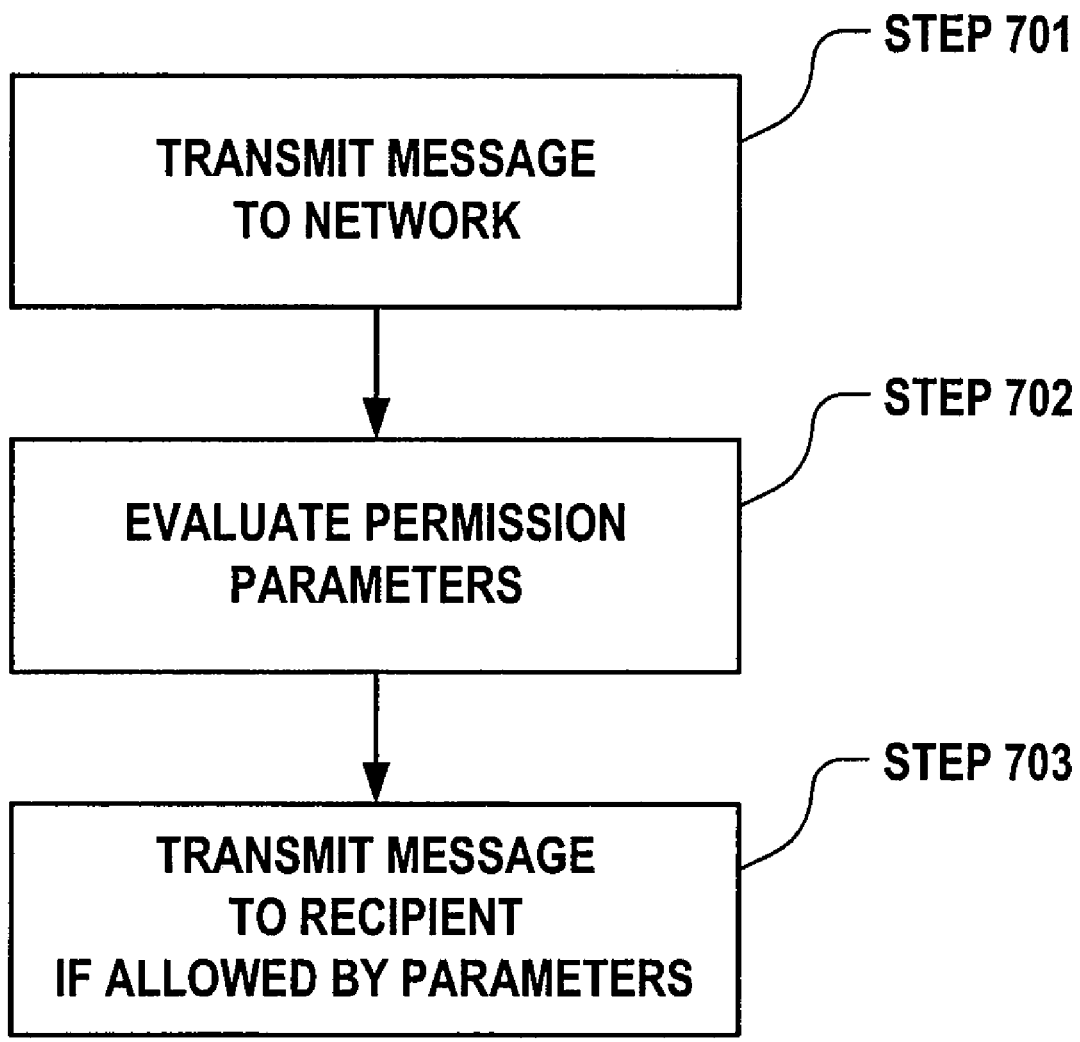
FIG. 7 shows an exemplary method for sending messages based on permission parameters.

Communication parameters such as sub-group intercommunication rules, blacklisting and whitelisting can be implemented at the network level or at the device level, as shown in FIG. 7. If implemented at the network level, a communication device transmits (step 701) a message to be evaluated by one or more system processors of the network. The network evaluates (step 702) the recipient of the message and determines whether the predefined blacklist and sub-group intercommunication parameters allow the message to be forwarded (step 703). In these embodiments, blacklists are one-way, meaning that they prevent messages from being received, not placed. In other embodiments, the whitelist, blacklist and sub-group intercommunication parameters are stored in individual communication devices. In these embodiments, the network attempts to deliver all messages to their intended recipients, but the recipient communication device determines (step 702) whether or not to present (step 703) the message to the recipient based on permission parameters stored in the device.

As a non-limiting example, a first fire station in Atlanta wishes to be able to communicate with the other fire stations in the Atlanta metropolitan area. To accomplish this, an administrator adds the first fire department to the "Fire Departments" network group for the Greater Atlanta metro area. The administrator then adds those fire stations outside the area of concern to the blacklist for the first fire station. These parameters allow the other firehouses in the "Fire Departments" network group to communicate freely with the first fire station. Messages will be transferred between the first fire station and all members of the "Fire Departments" group unless one member has been blacklisted by another member. Because during an emergency the fire station is under the control of Atlanta's Emergency Management Administration (EMA), the administrator may wish to add the EMA to the whitelist parameters for the first fire station. If the EMA has also whitelisted the fire station, they can freely communicate.

In some embodiments, the "two-doors to entry policy" is not applied. Some embodiments can incorporate a hang timer. A hang timer allows the network to transmit messages to a recipient group for a predetermined period of time even if the identity of the sender group does not exist in the communication permission parameters associated with the recipient group. As a non-limiting example, if a first user and a second user are in different network groups and the first group is on the second group's whitelist, but the second group is not on the first group's whitelist and a member of the second group messages the first group, the message will not be blocked by the network and messaging facilitated with a hang timer will be allowed. The hang timer will permit messages to be passed from the second group to the first group for a limited time.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

All references cited herein, including all U.S. and foreign patents, patent applications, all publications and other documentary materials, are specifically and entirely hereby incorporated by reference.

I claim:

1. A mobile communication device group management system, comprising:
    a communication device for sending a message from a member of a sender group, the message comprising an identification of a recipient group and an identification of the sender group,
    a network for receiving the message,
    a system data store in electronic communication with the network for storing at least one communication permission parameter associated with the sender group and at least one communication permission parameter associated with the recipient group, and
    a system processor in electronic communication with the system data store and configured to compare the identification of the sender group to the at least one communication permission parameter associated with the recipient group,
    wherein the system processor is further configured to transmit the message to the recipient group if the identity of the sender group exists in the at least one communication permission parameter associated with the recipient group.

2. The system of claim 1, wherein the communication permission parameter comprises at least one whitelist identity.

3. The system of claim 1, wherein the recipient group inherits at least one communication permission parameter from a second group in a hierarchical relationship with the recipient group.

4. The system of claim 1, wherein the sender group inherits at least one communication permission parameter from a second group in a hierarchical relationship with the sender group.

5. The system of claim 1, wherein the system processor is configured to allow an administrator override at least one communication permission parameter for a selected group.

6. The system of claim 1, wherein the system processor is further configured to transmit a plurality of messages to the recipient group for a predetermined period of time if the identity of the sender group does not exist in the at least one communication permission parameter associated with the recipient group.

7. The system of claim 1, wherein the communication device comprises an emergency group connect button for creating a message identifying a predetermined group as a recipient.

8. The system of claim 7, wherein the predetermined group is a public service agency.

9. A system for transmitting a message to a group of communication device users in an identified geographical area comprising:
    a graphical display for presenting a geographical representation of an area,
    a selection tool for identifying a location boundary defining an area on the graphical display,
    a system processor for comparing location data received from a communication device with the defined area and identifying at least one communication device user located within the defined area, and
    a network for transmitting a message from a sender to the at least one user located within the defined area.

10. The system of claim 9, wherein the network comprises an interworking device coupled to at least one dispatch network.

11. The system of claim 10, the at least one dispatch network being a radio access network.

12. The system of claim 11, wherein the radio access network further comprises a TDMA network and at least one other type of radio access network.

13. The system of claim 9, wherein the at least one user located within the defined area is defined as a recipient group.

14. The system of claim 13, further comprising an administrator for assigning at least one communication permission parameter for the recipient group.

15. The system of claim 13, wherein the sender is a member of a sender group and the message comprises an identification of the sender group.

16. The system of claim 15, further comprising a system data store in electronic communication with the network for storing at least one communication permission parameter associated with the sender group and at least one communication permission parameter associated with the recipient group, and
    the system processor being in electronic communication with the system data store and configured to compare the identification of the sender group to the least one communication permission parameter associated with the recipient group,
    wherein the system processor is further configured to transmit the message to the recipient group if the identity of the sender group exists in the at least one communication permission parameter.

17. A method for managing mobile communication group communication, comprising:
    sending a message from a member of a sender group,
    embedding in the message an identification of a recipient group and an identification of the sender group,
    transmitting the message to a network,
    comparing the identification of the sender group with a communication permission parameter associated with the recipient group, and
    transmitting the message to the recipient group if the identity of the sender group exists in the communication permission parameter associated with the recipient group.

18. The method of claim 17, wherein the communication permission parameter comprises at least one whitelist identity.

19. The method of claim 17, wherein the recipient group inherits at least one communication permission parameter from a second group in a hierarchical relationship with the recipient group.

20. The method of claim 17, wherein the sender group inherits at least one communication permission parameter from a second group in a hierarchical relationship with the sender group.

21. The method of claim 17, wherein an administrator overrides at least one communication permission parameter for a selected group.

22. The method of claim 17, further comprising transmitting a plurality of messages to the recipient group for a predetermined period of time if the identity of the sender group does not exist in the at least one communication permission parameter associated with the recipient group.

23. A method for managing mobile communication group communication, comprising:
   sending a message from a member of a sender group,
   embedding in the message an identification of a recipient group and an identification of the sender group,
   transmitting the message to a network,
   comparing the identification of the sender group with a communication permission parameter associated with the recipient group,
   comparing the identification of the recipient group with a communication permission parameter associated with the sender group, and
   transmitting the message to the recipient group if the identity of the sender group exists in the communication permission parameter associated with the recipient group and the identity of the recipient group exists in the communication permission parameter associated with the sender group.

24. A method for transmitting a message to a group of communication device users in an identified geographical area comprising:
   presenting a geographical representation of an area on a graphical display,
   identifying a location boundary defining an area on the graphical display with a selection tool,
   comparing location data received from a communication device with the defined area and identifying at least one communication device user located within the defined area, and
   transmitting a message over a network from a sender to the at least one user located within the defined area.

* * * * *